(12) United States Patent
Miyairi

(10) Patent No.: US 7,667,960 B2
(45) Date of Patent: Feb. 23, 2010

(54) DISK-DRIVE-EQUIPPED ELECTRONIC APPARATUS AND THE DISK DRIVE

(75) Inventor: Tatsuya Miyairi, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 11/784,877

(22) Filed: Apr. 10, 2007

(65) Prior Publication Data

US 2007/0253101 A1 Nov. 1, 2007

(30) Foreign Application Priority Data

Apr. 26, 2006 (JP) ............................. 2006-122417

(51) Int. Cl.
*H05K 7/12* (2006.01)
(52) U.S. Cl. ............................ 361/679.34; 361/679.37; 361/679.33; 360/97.01
(58) Field of Classification Search ............ 361/679.31, 361/679.34, 679.37, 679.33; 360/97.01
See application file for complete search history.

(56) References Cited

U.S. PATENT DOCUMENTS

| | | | | |
|---|---|---|---|---|
| 6,064,567 | A * | 5/2000 | Cheng ................... | 361/679.31 |
| 7,212,402 | B2 * | 5/2007 | Hsiao .................... | 361/679.33 |
| 2008/0089021 | A1 * | 4/2008 | Deng et al. ............ | 361/685 |

FOREIGN PATENT DOCUMENTS

| | | |
|---|---|---|
| CN | 2577406 Y | 10/2003 |
| JP | 64-7568 | 1/1989 |
| JP | 2921663 | 8/1996 |
| JP | 11-242881 | 9/1999 |
| JP | 2000-132960 | 5/2000 |
| JP | 3617973 | 2/2005 |

OTHER PUBLICATIONS

The First Office Action issued by Patent Office of the People's Republic of China against the corresponding Chinese patent application No. 200710097180X on Jun. 5, 2008.

* cited by examiner

*Primary Examiner*—Jayprakash N Gandhi
*Assistant Examiner*—Ingrid Wright
(74) *Attorney, Agent, or Firm*—Knobbe, Martens, Olson & Bear LLP

(57) ABSTRACT

According to one embodiment, an electronic apparatus includes a housing having a receptacle, a disk drive removably housed in the receptacle of the housing, and a shock-absorbing rubber member, which is elastically deformable and interposed between the receptacle and the disk drive. The shock-absorbing rubber member is provided on the disk drive and has a pickup portion on which a user puts fingers when the disk drive is to be removed out of the receptacle. The pickup portion is formed integral with the shock-absorbing rubber member.

15 Claims, 6 Drawing Sheets

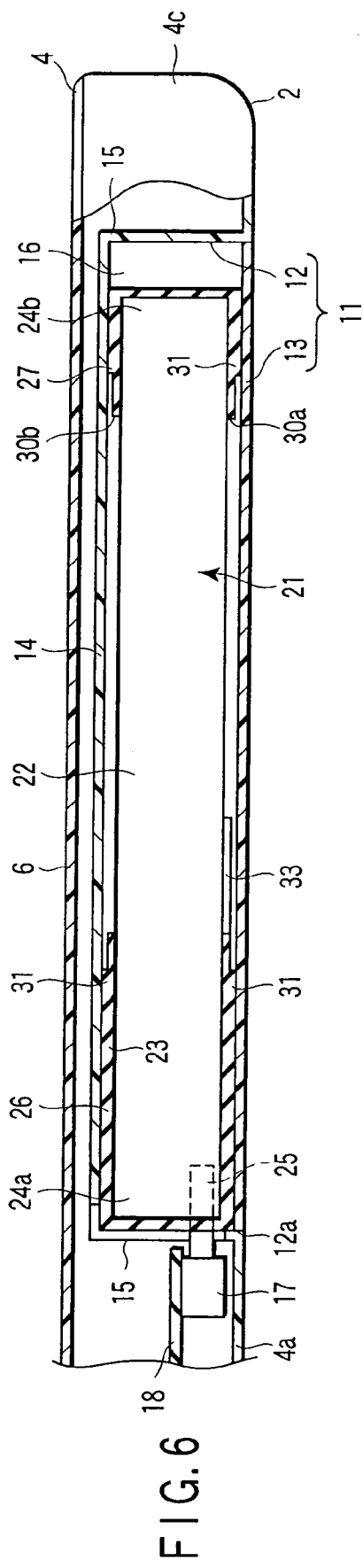
F I G. 6
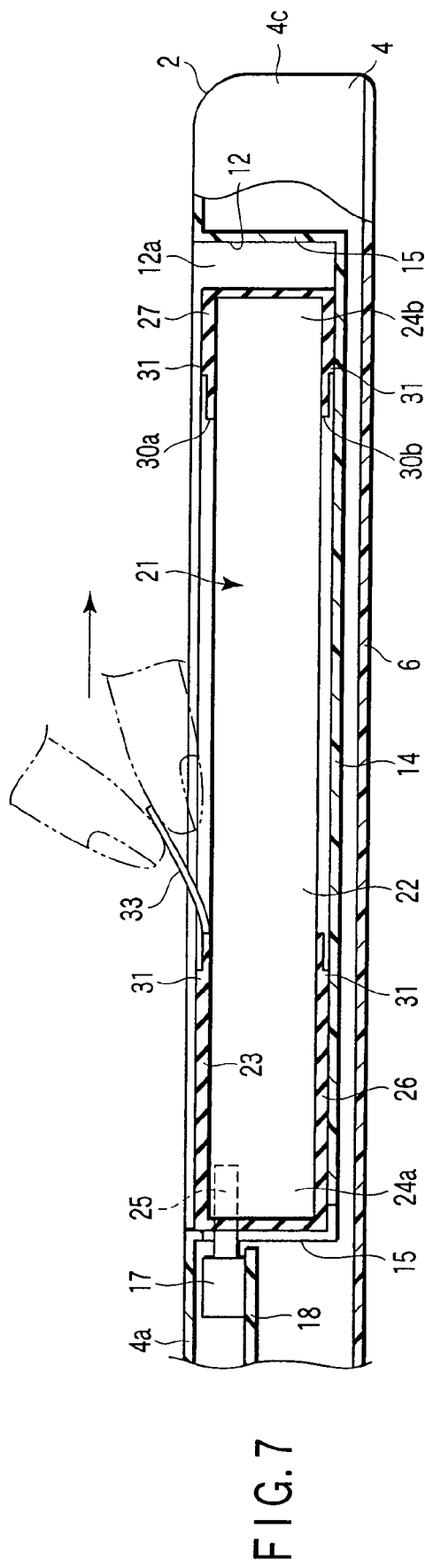
F I G. 7

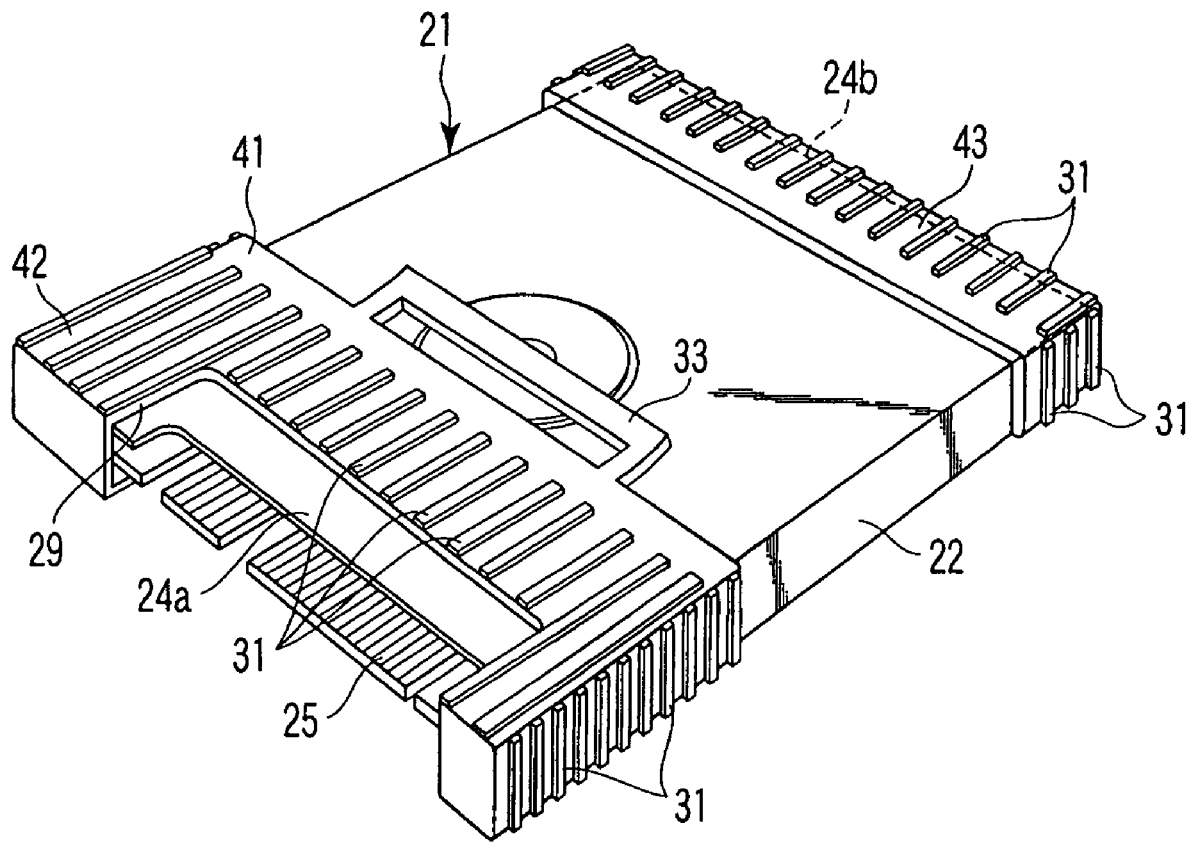
F I G. 8

DISK-DRIVE-EQUIPPED ELECTRONIC APPARATUS AND THE DISK DRIVE

CROSS-REFERENCE TO RELATED APPLICATIONS

This application is based upon and claims the benefit of priority from Japanese Patent Application No. 2006-122417, filed Apr. 26, 2006, the entire contents of which are incorporated herein by reference.

BACKGROUND

1. Field

One embodiment of the present invention relates to an electronic apparatus, such as a portable computer equipped with a hard disk drive, and more particularly to a structure of a shock-absorbing rubber member protecting the hard disk drive from shock. The present invention also relates to a disk drive having a shock-absorbing rubber member.

2. Description of the Related Art

An electronic apparatus, such as a portable computer is equipped with a hard disk drive (hereinafter referred to as HDD), which allows writing and reading of high volume data. The HDD is housed in the housing of an electronic apparatus, and can be removed from the housing if necessary.

It is known that the HDD is especially vulnerable to shock or vibration. Therefore, a plurality of rubber dampers which absorb shock or vibration are attached to the HDD in the conventional electronic apparatus, as disclosed in Japanese Patent No. 3617973 or Jpn. Pat. Appln. KOKAI Publication No. 11-242881. The rubber dampers are interposed between the HDD and inner surfaces of the housing. The rubber dampers absorb shock or vibration, which is transmitted from the housing to the HDD, for example, when the electronic apparatus is transported. Thus, the dampers increase the shock resistance of the HDD.

In the conventional electronic apparatus, the shock-absorbing rubber dampers tightly fill in gaps between the HDD and the inner surfaces of the housing. Therefore, for example, when the HDD is slid out of the housing, friction force to prevent the HDD from sliding occurs at a contact portion between the housing and the rubber dampers. The friction force causes resistance when the HDD is to be removed out of the housing.

Further, since a recent electronic apparatus has a thin and compact housing, there is no space for a finger or a tool, such as a driver, to be inserted therein. In addition, the HDD is tightly engaged with a connector provided in the housing. Therefore, when the HDD is to be removed from the housing, the HDD need be slid with large force, which overcomes the force of the rubber dampers and the force engaging the HDD and the connector.

Accordingly, the HDD must have a special-purpose structural element to assist removal of the HDD, resulting in increase in number of the attachments for the HDD.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary cross-sectional view of the portable computer according to the first embodiment of the present invention, showing a state in which the HDD is housed in the receptacle of the housing;

FIG. 7 is an exemplary cross-sectional view of the portable computer according to the first embodiment of the present invention, showing a state in which a pickup portion of a shock-absorbing rubber member is picked up by fingers to remove the HDD from the receptacle;

FIG. 8 is an exemplary perspective view of an HDD according to a second embodiment of the present invention.

DETAILED DESCRIPTION

Various embodiments according to the invention will be described hereinafter with reference to the accompanying drawings. In general, according to one embodiment of the invention, an electronic apparatus comprises a housing having a receptacle, a disk drive removably housed in the receptacle of the housing, and a shock-absorbing rubber member, which is elastically deformable and interposed between the receptacle and the disk drive, the shock-absorbing rubber member being provided on the disk drive. The shock-absorbing rubber member has a pickup portion on which a user puts fingers when the disk drive is to be removed out of the receptacle, the pickup portion being formed integral with the shock-absorbing rubber member.

A first embodiment of the present invention will be described with reference to FIGS. 1 to 7.

Figure 1:
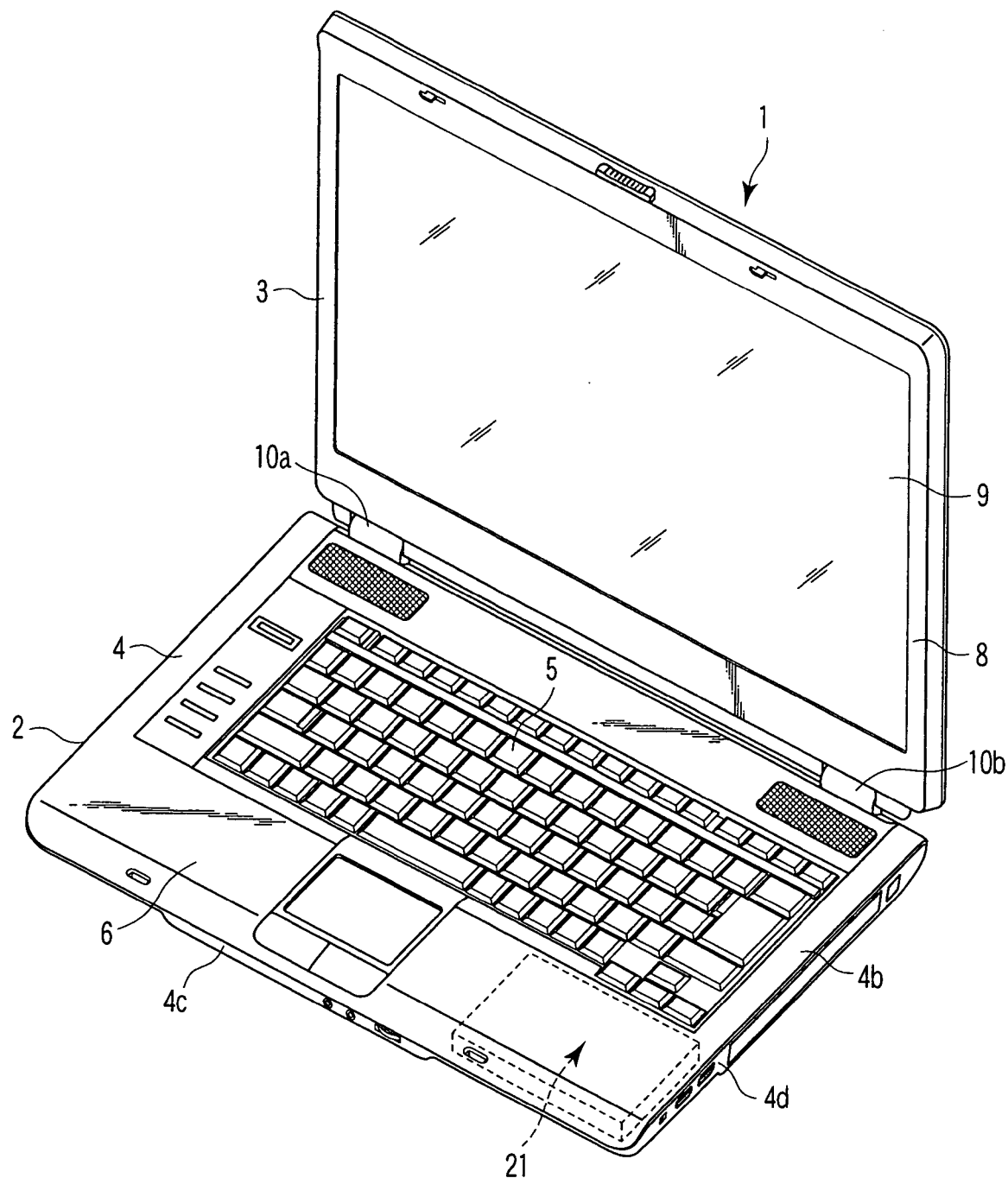
FIG. 1 is a perspective view of an exemplary portable computer according to a first embodiment of the present invention.

FIG. 1 shows a portable computer 1, an example of the electronic apparatus. The portable computer 1 includes a main unit 2 and a display unit 3.

The main unit 2 comprises a housing 4. The housing 4 is shaped as a flat box, having a bottom wall 4a, an upper wall 4b, a front wall 4c, left and right side walls 4d and a back wall which is not shown. The upper wall 4b of the housing 4 supports a keyboard 5. A part of the upper wall 4b, which is located in front of the keyboard 5, serves as a palm rest 6. The palm rest 6, extending in the width direction of the housing 4, and supports the operator's hands, while he or she is operating the keyboard 5.

The display unit 3 comprises a display housing 8 and a liquid crystal display panel 9 housed in the display housing 8. The display housing 8 is supported by a back end portion of the housing 4 via a pair of hinges 10a and 10b. The display unit 3 is rotatable between a closed position and an open position. In the closed position, the display unit 3 lies over the housing 4 to cover the keyboard 5 and the palm rest 6 from above. In the open position, the display unit 3 stands from the back end portion of the housing 4 to expose the keyboard 5, the palm rest 6 and the liquid crystal display panel 9.

Figure 2:
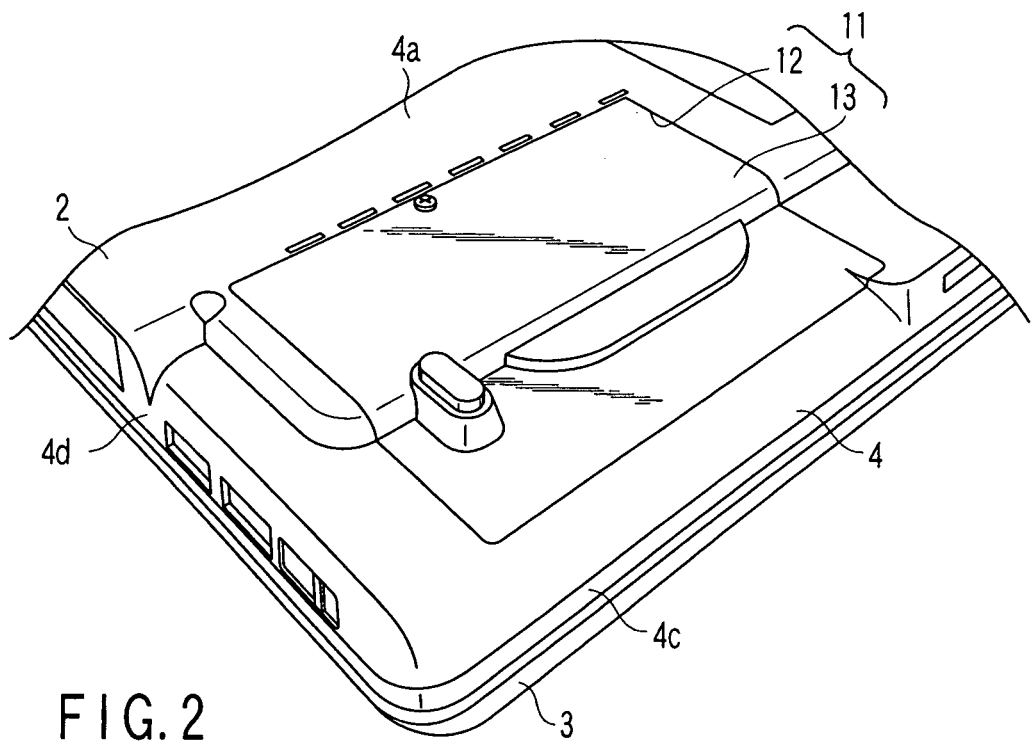
FIG. 2 is an exemplary perspective view of the portable computer according to the first embodiment of the present invention, showing a receptacle which houses an HDD.
Figure 3:
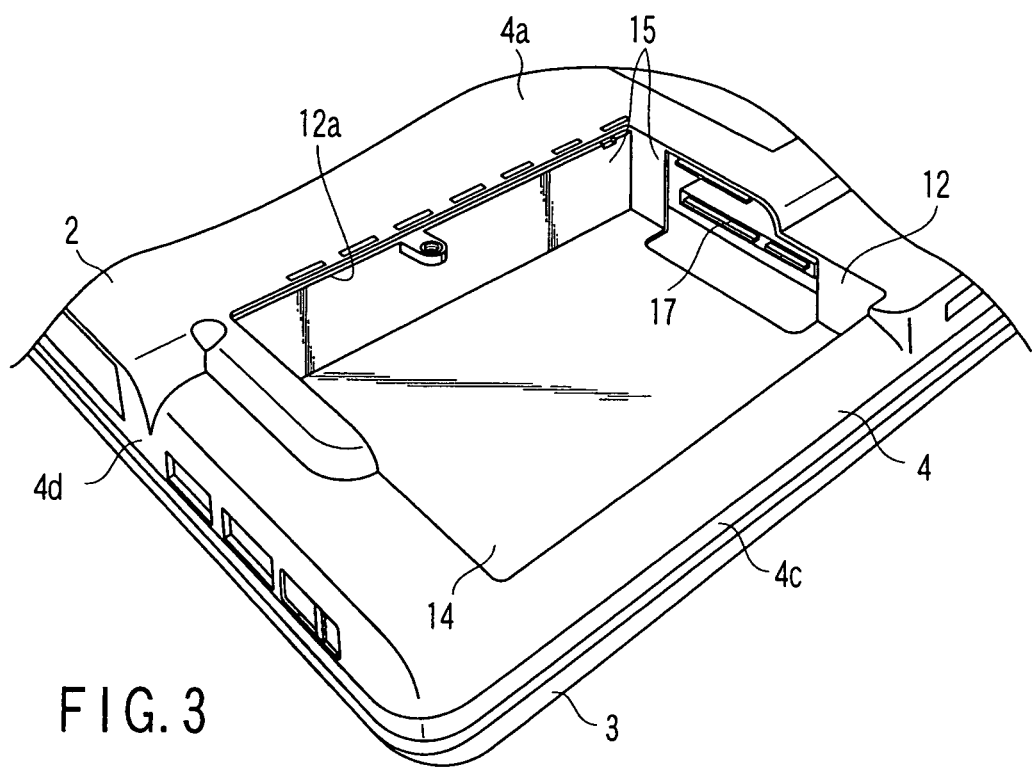
FIG. 3 is an exemplary perspective view of the portable computer according to the first embodiment of the present invention, showing a state in which a back cover of the portable computer is removed to expose a recess of the housing.
Figure 4:
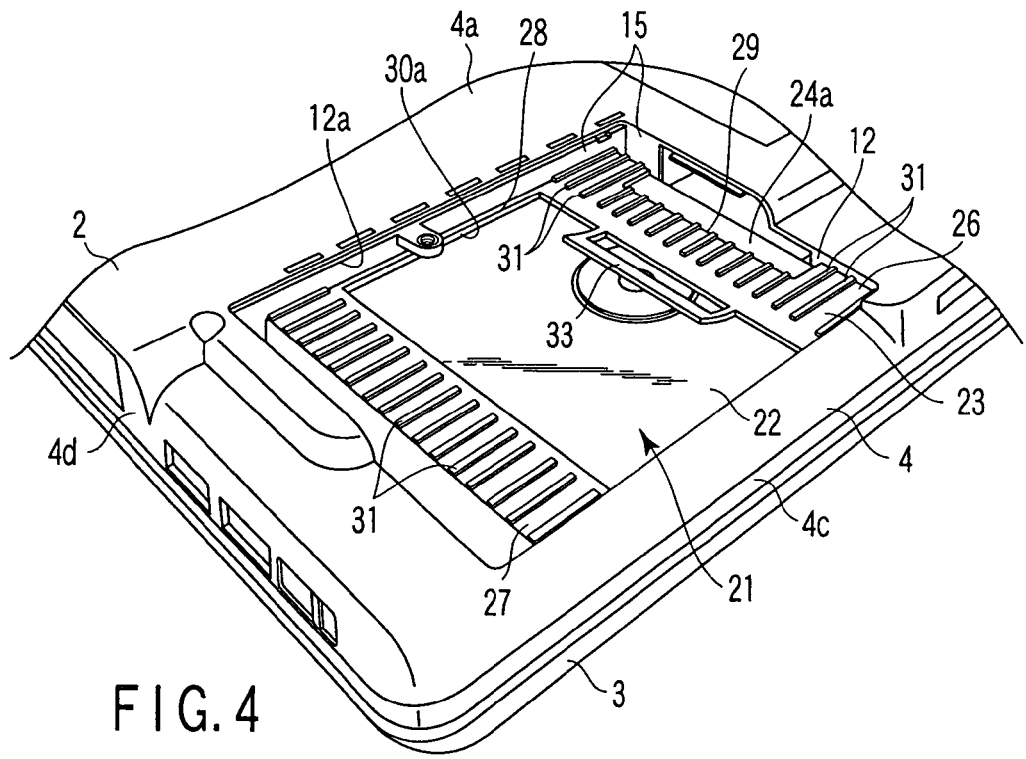
FIG. 4 is an exemplary perspective view of the portable computer according to the first embodiment of the present invention, showing a state in which the HDD is housed in the recess of the housing.
Figure 5:
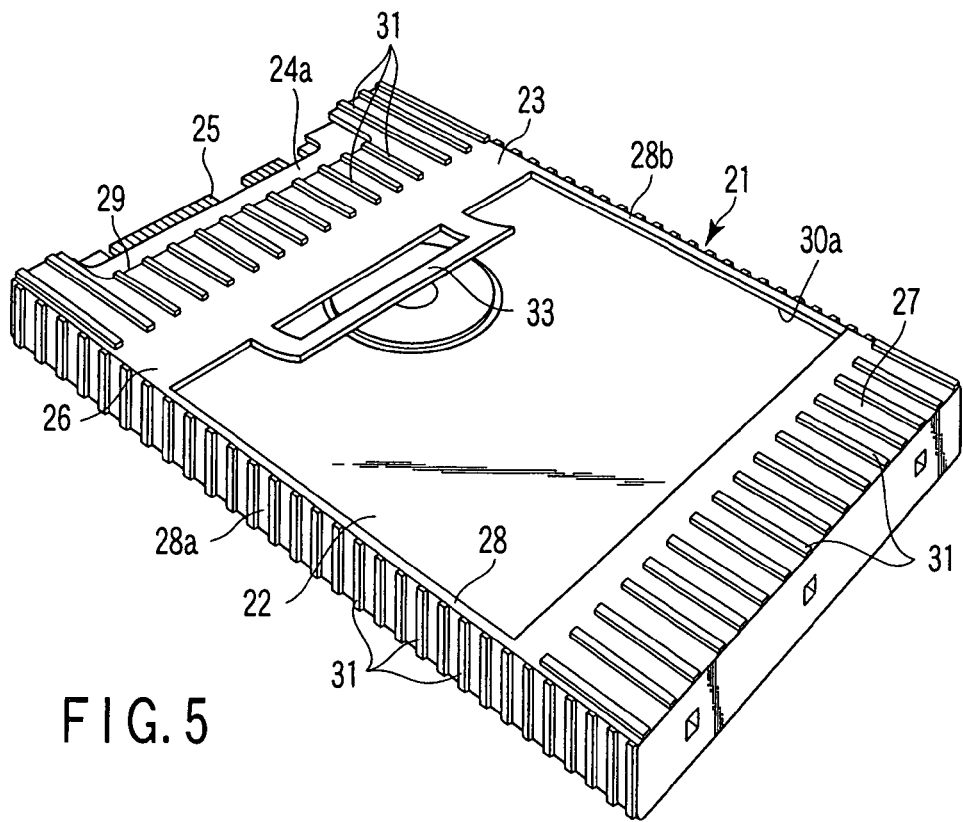
FIG. 5 is an exemplary perspective view of the HDD according to the first embodiment of the present invention.

As shown in FIGS. 2 to 4, the housing 4 comprises a receptacle 11. The receptacle 11 is located in a right side portion of the palm rest 6. The receptacle 11 is composed of a recess 12 and a back cover 13.

The recess 12 is formed integral with the bottom wall 4a of the housing 4. The recess 12 has a rectangular opening portion 12a opening in the bottom wall 4a, a support wall 14 facing the opening portion 12a and a plurality of peripheral walls 15, each connecting an edge of the support wall 14 and an opening edge of the opening portion 12a. The back cover 13 is removably supported by the bottom wall 4a to cover the opening portion 12a of the recess 12. The back cover 13 faces the support wall 14, and forms a receptacle chamber 16, as shown in FIG. 6, in conjunction with the support wall 14 and the peripheral walls 15.

A first connector 17 is arranged at an end of the receptacle chamber 16. The first connector 17 is mounted on a printed wiring board 18. The printed wiring board 18 is housed in the housing 4.

As shown in FIGS. 4 and 6, an HDD 21 is removably housed in the receptacle chamber 16 of the receptacle 11. The HDD 21 is an example of disk drives. The HDD 21 comprises a main body 22 and a shock-absorbing rubber member 23.

The main body 22 is shaped as a flat box having a size which can be housed in the recess 12 of the housing 4. The interior of the housing 22 is a clean enclosed space. The enclosed space contains various structural elements, such as a plurality of magnetic disks, a carriage having a magnetic head, and a spindle motor which rotates the magnetic disks.

The main body 22 of the HDD 21 has a first end 24a, and a second end 24b opposite to the first end 24a. A second connector 25 is arranged at the first end 24a of the main body 22. The second connector 25 is coupled to the first connector 17 by sliding the main body 22 to the first connector 17 inside the recess 12. With this coupling, the HDD 21 is electrically connected to the printed wiring board 18 and the HDD 21 is held inside the recess 12.

The shock-absorbing rubber member 23 absorbs shock or vibration externally exerted on the HDD 21. It is a unitary elastic body made of soft rubber, such as silicone rubber. It includes a first portion 26, a second portion 27 and a third portion 28.

The first portion 26 of the shock-absorbing rubber member 23 covers the first end 24a of the main body 22 of the HDD 21 from outside. The first portion 26 has a cut portion 29, through which the second connector 25 is exposed.

The second portion 27 of the shock-absorbing rubber member 23 covers the second end 24b of the main body 22 of the HDD 21 from outside. The third portion 28 has a pair of band portions 28a and 28b. The band portions 28a and 28b are separated from each other along the width direction of the main body 22. The band portions 28a and 28b connect the first portion 26 and the second portion 27 to form the unitary body.

Thus, the shock-absorbing rubber member 23 has dimensions corresponding to those of the main body 22 of the HDD 21, and has rectangular insertion ports 30a and 30b, which allow insertion of the main body 22 between the first portion 26 and the second portion 27.

Further, the shock-absorbing rubber 23 of this embodiment has a plurality of projections 31 on the surfaces of the first to third portions 26 to 28. The projections 31 on the third portion 28 extend in the thickness direction of the main body 22 and the projections 31 on the first and second portions extend in the longitudinal direction of the main body 22. The adjacent projections are separated from each other and parallel to each other. When the opening portion 12a of the recess 12 is closed by the back cover 13, the top ends of the projections 31 are elastically brought into contact with the inner surface of the support wall 14, the inner surfaces of the peripheral walls 15 and the inner surface of the back cover 13.

Thus, the shock-absorbing rubber member 23 is interposed between the main body 22 of the HDD 21 and the inner surfaces of the receptacle chamber 16, and fills in the gaps therebetween.

As shown in FIGS. 4 to 7, a pickup portion 33 is formed integral with the first portion 26 of the shock-absorbing rubber member 23. The pickup portion 33 extends like a tongue from an edge of the first portion 26 in the direction opposite from the second connector 25. It has a size suitable for pickup by fingers. The pickup portion 33 is provided nearer to the first end 24a of the main body 22 than the second end 24b, and adjacent to the second connector 25.

The pickup portion 33 is located between the back cover 13 and the main body 22. When the back cover 13 is removed from the housing 4, the pickup portion 33 is exposed through the opening portion 12a of the recess 12. The pickup portion 33 of this embodiment is given elasticity, by which it is bent away from the main body 22 when the back cover 13 is removed from the housing 4.

FIG. 7 shows a state in which the pickup portion 33 of the shock-absorbing rubber member 23 is picked up by fingers to pull the HDD 21 in a direction away from the first connector 17. When the pickup portion 33 is pulled in the direction of the arrow shown in FIG. 7, the main body 22 is slid in the direction away from the first connector 17 against the force connecting the first connector 17 and the second connector 25. As a result, the second connector 25 is disconnected from the first connector 17, thus releasing the connection between the first connector 17 and the second connector 25. Therefore, the HDD 21 can be removed out of the receptacle chamber 16.

When the connection between the first connector 17 and the second connector 25 is released, tensile force is applied to the pickup portion 33 and the first portion 26 of the shock-absorbing rubber member 23. In this time, if the pickup portion 33 and the first portion 26 are stretched too much, the stretching force will absorb the tensile force which should be transmitted to the connecting portion between the first connector 17 and the second connector 25. As a result, the second connector 25 cannot be withdrawn from the first connector 17.

Therefore, it is necessary for the shock-absorbing rubber member 23 including the pickup portion 33 to have strength that can stand for the tensile force applied thereto, when the connection between the first connector 17 and the second connector 25 is released. The tensile strength of the shock-absorbing rubber member 23 is closely related to the shock-absorbing property (modulus of elasticity) of the shock-absorbing rubber member 23. Therefore, it is desirable that the tensile strength of the shock-absorbing rubber member 23 be suitably set, for example, by changing the material of the shock-absorbing rubber member 23 in accordance with the shock-absorbing property required for the shock-absorbing rubber member 23.

In the first embodiment described above, if shock is exerted on the housing 4, the shock-absorbing rubber member 23 elastically deforms, depending on the magnitude of the shock and the direction in which the shock is applied. The deformation of the shock-absorbing rubber member 23 absorbs the shock, which is going to be transmitted from the housing 4 to the HDD 21.

As a result, the shock exerted on the HDD 21 is absorbed; that is, the shock resistance of the HDD 21 is increased.

To the HDD 21 out of the receptacle chamber 16, first, the housing 4 is reversed so that the bottom wall 4a of the housing 4 faces up, as shown in FIG. 7. In this state, the back cover 13 is removed from the bottom wall 4a of the housing 4. As a result, the pickup portion 33 of the shock-absorbing rubber member 23 is exposed through the opening portion 12a of the recess 12.

Then, the pickup portion 33 is picked up by fingers and pulled in the direction away from the first connector 17, so that the main body 22 of the HDD 21 is slid in the receptacle chamber 16. As a result, the connection between the first connector 17 and the second connector 25 is released, and the HDD 21 can be removed out of the receptacle chamber 16.

According to the first embodiment of the present invention, the shock-absorbing rubber member 23 has an additional function of ejecting the HDD 21 out of the receptacle chamber 16. Therefore, a special-purpose structural element to assist removal of the HDD 21 need not be added to the main body 22 of the HDD 21. Accordingly, the number of attachments for the HDD can be reduced. Consequently, the cost of manufacturing the HDD 21 can be reduced, resulting in an inexpensive portable computer 1.

Further, the shock-absorbing rubber member 23 has the elongated projections 31 on the surfaces thereof. The top ends of the projections 31 are elastically brought into contact with the inner surfaces of the receptacle chamber 16. Therefore, the area in which the shock-absorbing rubber member 23 is in contact with the inner surfaces of the receptacle chamber 16 is reduced, and accordingly the friction resistance that occurs in the contact area is reduced, as compared to the conventional art. Therefore, the main body 22 can be slid by pulling the pickup portion 33 with small force, so that the HDD 21 can easily be removed from the receptacle chamber 16.

In addition, when shock is transmitted from the housing 4 to the shock absorbing rubber member 23, the projections 31 in contact with the housing 4 is elastically deformed easily, thereby efficiently absorbing the shock. Therefore, although the shock-absorbing rubber member 23 has high modulus of elasticity to prevent the pickup portion 33 from stretching, the shock-absorbing property of the shock absorbing rubber member 23 is kept satisfactory.

The present invention is not limited to the first embodiment described above, but can be modified variously without departing from the gist of the invention.

FIG. 8 shows a second embodiment of the present invention.

The second embodiment is the same as the first embodiment except the structure of a shock absorbing rubber member 41. Therefore, in the following description of the second embodiment, the same components as those of the first embodiment are identified by the same reference numerals as those used for the first embodiment, and the description thereof are omitted.

As shown in FIG. 8, the shock-absorbing rubber member 41 of the second embodiment has a first portion 42 and a second portion 43. The first portion 42 covers the first end 24a of the main body 22 of the HDD 21. The first portion 42 has, as a unitary body, a cut portion 29 through which the second connector 25 is exposed, a plurality of projections 31 and a pickup portion 33. The second portion 43 covers the second end 24b of the main body 22 of the HDD 21, and has a plurality of projections 31, which are formed integrally as a unitary body. The first portion 42 and the second portion 43 are separated from each other in the longitudinal direction of the main body 22.

In the above structure, the first portion 42 of the shock-absorbing rubber member 41 has an additional function of ejecting the HDD 21 out of the receptacle chamber 16. Therefore, a special-purpose structural element to assist removal of the HDD 21 need not be added to the main body 22 of the HDD 21. Accordingly, the number of attachments for the HDD 21 can be reduced.

Moreover, according to the second embodiment, since the first portion 42 having the pickup portion 33 is separated from the second portion 43, the first portion 42 and the second portion 43 may have different hardness.

More specifically, the modulus of elasticity of the first portion 42 having the pickup portion 33 may be higher than that of the second portion 43. Therefore, it is possible to adopt a structure, in which the pickup portion 33 and the first portion 42 do not easily stretch, when the pickup portion 33 is pulled to remove the HDD 21 removed out of the receptacle chamber 16.

In addition, since the modulus of elasticity of the second portion 43 is lower than that of the first portion 42, the shock-absorbing property of the shock absorbing rubber member 42 is kept satisfactory, while the tensile strength of the first portion 42 is ensured.

Figure 9:
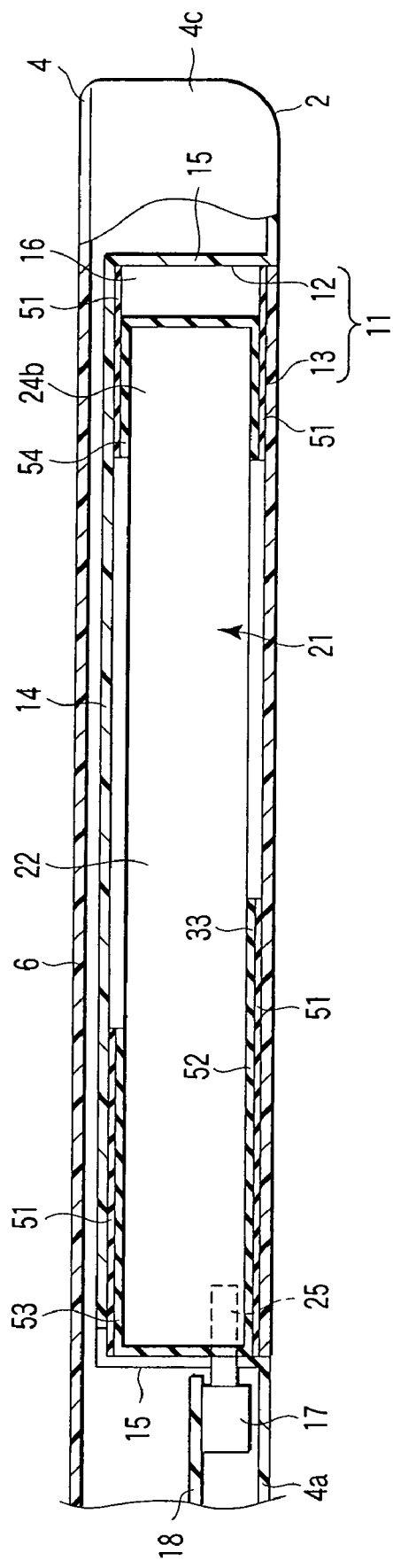
FIG. 9 is an exemplary cross-sectional view of the portable computer according to a third embodiment of the present invention, showing a state in which an HDD is housed in a receptacle of a housing.

FIG. 9 shows a third embodiment of the present invention.

In the third embodiment, a plurality of first shock-absorbing rubber members 51 are fixed by an adhesive or the like to the inner surfaces of the recess 12 and the inner surface of the back cover 13. The first shock-absorbing rubber members 51 are elastic bodies made of soft rubber, such as silicone rubber.

A second shock-absorbing rubber member 52 is attached to the main body 22 of the HDD 21. The second shock-absorbing rubber member 52 is an elastic body made of soft rubber, such as silicone rubber. The modulus of elasticity of the second shock-absorbing rubber member 52 is higher than that of the first shock-absorbing rubber members 51. In other words, the second shock-absorbing member 52 is harder to elastically deform as compared to the first shock-absorbing rubber members 51.

The second shock-absorbing rubber member 52 has a first portion 53 and a second portion 54. The first portion 53 covers the first end 24a of the main body 22 of the HDD 21. The first portion 53 has an integrally formed pickup portion 33. The second portion 54 covers the second end 24b of the main body 22 of the HDD 21. The first portion 53 and the second portion 54 are separated from each other in the longitudinal direction of the main body 22.

When the HDD 21 is housed in the recess 12, and the opening portion 12a of the recess 12 is closed by the back cover 13, the second shock-absorbing rubber member 52 is interposed between the main body 22 of the HDD 21 and the first shock-absorbing rubber members 51. Thus, the first and second shock-absorbing rubber members 51 and 52, which have different moduli of elasticity, are overlaid and interposed between the main body 22 of the HDD 21 and the inner surfaces of the receptacle chamber 16. Thus the gaps between the main body 22 and the receptacle chamber 16 are filled with the first and second shock-absorbing rubber members 51 and 52.

With the above structure, the two kinds of shock-absorbing rubber members 51 and 52, having different modulis of elasticity, absorb the shock that is going to be transmitted from the housing 4 to the HDD 21.

Especially since the first shock-absorbing rubber members 51 fixed to the inner surfaces of the receptacle chamber 16 is softer than the second shock-absorbing rubber member 52 attached to the HDD 21, they quickly absorb most of the shock applied to the housing 4 before transmission to the second shock-absorbing rubber member 52.

Further, because of the existence of the first shock-absorbing rubber members 51, the modulus of elasticity of the second shock absorbing rubber member 52 can be higher. Therefore, when the HDD 21 is taken out of the receptacle chamber 16, even if the pickup portion 33 is pulled, the pickup portion 33 and the first portion 53 cannot be easily stretched. Consequently, the HDD 21 can be easily taken out of the receptacle chamber 16.

The present invention can also be achieved, even if the disk drive stored in the receptacle of the housing is an optical disk drive, instead of the HDD used in the above embodiments.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the inventions.

The invention claimed is:

1. An electronic apparatus comprising:
a housing having a receptacle with a first connector arranged thereon;
a disk drive removably housed in the receptacle, the disk drive being provided with a main body that has outer peripheral surfaces including an upper surface, a lower surface and two side surfaces, the main body having a first end, a second end opposite to the first end, and a second connector arranged on the first end and removably connected to the first connector; and
a shock-absorbing rubber member, which is elastically deformable and interposed between the receptacle and the main body of the disk drive, the shock-absorbing rubber member being provided on the disk drive to cover the outer peripheral surfaces of the main body and having a pickup portion on which a user puts fingers, the pickup portion being formed integral with the shock-absorbing rubber member and being superposed on a portion of the main body located nearer to the first end with the second connector arranged thereon than the second end, the first connector and the second connector being disconnected from each other when the pickup portion of the shock-absorbing rubber member is pulled in a direction, in which the pickup portion is away from the first connector, to remove the disk drive from the receptacle.

2. The electronic apparatus of claim 1, wherein the shock-absorbing rubber member has strength that stands for tensile force applied to the pickup portion when the connection between the first connector and the second connector is released.

3. The electronic apparatus of claim 1, wherein the shock-absorbing rubber member has first to third portions, the first portion covering the first end of the disk drive, the second portion covering the second end of the disk drive, the third portion connecting the first portion and second portion, and the pickup portion being formed integral with the first portion.

4. The electronic apparatus of claim 1, wherein the shock-absorbing rubber member has a first portion and a second portion, the first portion covering the first end of the disk drive, the second portion covering the second end of the disk drive, and the pickup portion being formed integral with the first portion.

5. The electronic apparatus according to claim 4, wherein the first portion and the second portion are separated from each other, and the first portion has higher modulus of elasticity than the second portion.

6. The electronic apparatus according to claim 1, wherein the shock-absorbing rubber member has a plurality of projections on its surface, and the plurality of projections are elastically brought into contact with inner surfaces of the receptacle when the disk drive is housed in the receptacle.

7. The electronic apparatus according to claim 1, wherein the receptacle includes a recess having an opening portion opening to a bottom wall of the housing, and a back cover removably supported by the bottom wall to cover the opening portion, the main body having a size sufficient to be received in the recess, the pickup portion of the shock-absorbing rubber member being located between the main body and the back cover.

8. The electronic apparatus according to claim 7, wherein when the back cover is removed from the bottom wall of the housing, the pickup portion is exposed to an outside of the housing through the opening portion, and is bent away from the main body.

9. An electronic apparatus comprising:
a housing including a receptacle with a first connector arranged thereon;
a first shock-absorbing rubber member provided on inner surfaces of the receptacle;
a disk drive removably housed in the receptacle of the housing, the disk drive being provided with a main body that has outer peripheral surfaces including an upper surface, a lower surface and two side surfaces, the main body having a first end, a second end opposite to the first end, and a second connector arranged on the first end and removably connected to the first connector; and
a second shock-absorbing rubber member, which is provided on the disk drive to cover the outer peripheral surfaces of the main body, and is laid over the first shock-absorbing rubber member when the disk drive is housed in the receptacle,
wherein the second shock-absorbing rubber member is harder than the first shock-absorbing member, and has a pickup portion on which a user puts fingers the pickup portion being formed integral with the shock-absorbing rubber member and being superposed on a portion of the main body located nearer to the first end with the second connector arranged thereon than the second end, the first connector and the second connector being disconnected from each other when the pickup portion of the shock-absorbing rubber member is pulled in a direction, in which the pickup portion is away from the first connector, to remove the disk drive from the receptacle.

10. The electronic apparatus of claim 9, wherein the second shock-absorbing rubber member has strength that stands for tensile force applied to the pickup portion when the connection between the first connector and the second connector is released.

11. A disk drive comprising:
a main body removably housed in a receptacle comprising a first connector the main body comprising outer peripheral surfaces, first end, a second end opposite to the first end, and a second connector arranged on the first end and removably connected to the first connector; and a shock-absorbing rubber member, which is elastically deformable and interposed between the main body and the receptacle, the shock-absorbing rubber member being provided on the disk drive to cover the outer peripheral surfaces of the main body and having a pickup portion on which a user puts fingers, the pickup portion being formed integral with the shock-absorbing rubber member and being superposed on a portion of the main body located nearer to the first end with the second connector arranged thereon than the second end, the first connector and the second connector being disconnected from each other when the pickup portion of the shock-absorbing rubber member is pulled in a direction, in which the pickup portion is away from the first connector, to remove the disk drive from the receptacle.

12. The disk drive of claim 11, wherein the shock-absorbing rubber member has strength that stands for tensile force applied to the pickup portion when the connection between the first connector and the second connector is released.

13. The disk drive of claim 11, wherein the shock-absorbing rubber member has first to third portions, the first portion covering the first end of the main body, the second portion covering the second end of the main body, the third portion connecting the first portion and second portion, and the pickup portion being formed integral with the first portion.

14. The disk drive according to claim 13, wherein the shock-absorbing rubber member has an opening, provided between the first portion and the second portion, and the opening allows passage of the main body therethrough.

15. The disk drive according to claim 11, wherein the shock-absorbing rubber member has a plurality of projections on its surface, and the plurality of projections are elastically brought into contact with inner surfaces of the receptacle when the main body is housed in the receptacle.

* * * * *